May 28, 1957  F. H. HIGHLEY  2,793,825
AUTOMATIC HIGH LIFT TAKE-OFF APPARATUS FOR AIRCRAFT
Filed June 24, 1954  2 Sheets-Sheet 1

*INVENTOR.*
FRANK H. HIGHLEY
BY
*R. L. Miller*
ATTORNEY

May 28, 1957  F. H. HIGHLEY  2,793,825
AUTOMATIC HIGH LIFT TAKE-OFF APPARATUS FOR AIRCRAFT
Filed June 24, 1954  2 Sheets-Sheet 2

INVENTOR.
FRANK H. HIGHLEY
BY
R. L. Miller
ATTORNEY

United States Patent Office 2,793,825
Patented May 28, 1957

2,793,825

AUTOMATIC HIGH LIFT TAKE-OFF APPARATUS FOR AIRCRAFT

Frank H. Highley, Canton, Ohio, assignor to The Goodyear Tire & Rubber Company, Akron, Ohio, a corporation of Ohio Application June 24, 1954, Serial No. 439,048

2 Claims. (Cl. 244—42)

This invention relates to apparatus useful in airplane take-off for reducing the take-off run, and reducing the stop distance of the airplane in case of a rejected take-off, by use of automatic controls for operation of high lift apparatus at optimum time when a take-off actually is to occur.

Appreciable work has been done in the past and is currently being done in the matter of aircraft landing operations so as to reduce the total amount of landing run of an airplane. Much of this work is of the type relating to the braking action on the airplane and the prevention of skids in landing.

Insofar as I am aware, no action has been taken heretofore with reference to attempting to reduce the take-off distance for aircraft by special apparatus provided thereon, except for the work done in providing auxiliary jet propulsion means on aircraft for use in take-offs.

Airplanes as conventionally made today have airfoils or wings with separate flaps provided thereon for increasing the lift of the wings upon taking off and landing to reduce the take-off and landing speeds of the aircraft. Operatively positioning the flaps for take-off conditions increases the drag or air resistance on the airplane, so that bringing the airplane up to take-off speed requires more energy, time and distance than if the run were made with the flaps retracted. However, the flaps must be operatively positioned at take-off to provide the required lift action. The flaps are retracted when the airplane is cruising for maximum operating speed of the airplane. Normally the pilot when taking off would first extend the flaps from the wing to take-off position and then start his take-off run. After the airplane has taken off and established satisfactory air speed and height, the flaps are retracted to an inoperative position by control means provided therefor. Likewise in landing an airplane, the pilot normally lowers the air flaps shortly before landing and retains the flaps in extended, operating position until the airplane has been brought to a halt. The expressions "V₁" and "V₂" as used in the specification refer to the speed at which one engine fails but at which a safe braked stop can be effected on the airfield, and to the minimum safe take-off speed, respectively.

It is the general object of the present invention to provide apparatus to effect take-off of an airplane in a reduced distance by having the aircraft run along the ground with its wing flaps in an inoperative position and to move such flaps rapidly and automatically to operative position when take-off speed is reached.

Another object of the invention is to provide apparatus in the airplane for automatically controlling the positioning of the wing flaps of the plane for both reducing the length of take-off run required for the airplane and for reducing the length of braking run for the airplane on a rejected take-off by a proper control of the wing flaps, dependent upon the dynamic pressures created by the air density and airplane speed.

Another object of the invention is to provide mechanism which automatically functions without pilot attention by the dynamic pressure during the few seconds just preceding the airplane being airborne to establish desirable operating conditions for the airplane for take-off at the end of a successful take-off run.

A further object of the invention is to provide means in an aircraft for retaining maximum load on the support struts and wheels until V₂ or take-off speed is reached so that if a rejected take-off occurs the airplane can have maximum braking action exerted on the wheels because of the maximum load carried thereby.

Another and further object of the invention is to provide control means in an aircraft which can be adjusted to operate the wing flap control means of the aircraft automatically dependent upon the desired and/or required take-off speed for the particular aircraft, the existing air density and the gross weight of the aircraft.

The foregoing and other objects will appear from the following description when taken in conjunction with the accompanying drawings.

For a better understanding of the invention, reference should be had to the accompanying drawings, wherein:

Fig. 1 of the drawings shows a side elevation of an aircraft having a diagrammatic representation of apparatus of the invention associated therewith;

For convenience in identifying corresponding parts shown in the drawings and referred to in the specification, the same numerals are used in both the drawings and specification for referring to such corresponding parts.

Figure 1:
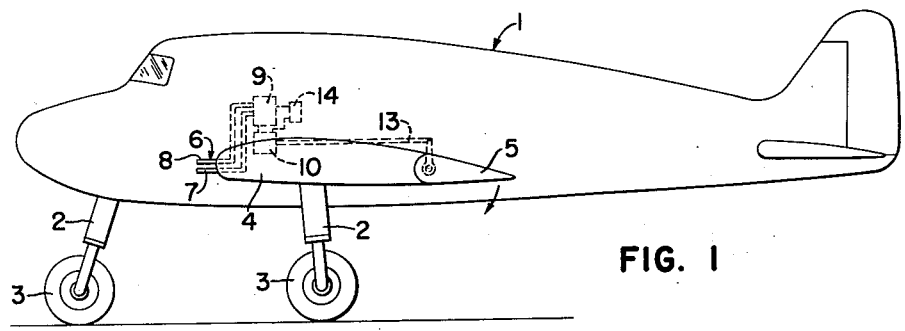

The invention, broadly, relates to an airplane having airfoils or wings and auxiliary movable flaps for increasing the lift of the airfoils, means for moving the flaps to operating position, and automatic means controlled by the dynamic pressure for actuating the flap moving means to move the flaps to the take-off, i. e., high lift position.

Reference now should be had to the details of the structure shown in the drawings and wherein an airplane is indicated as a whole by the numeral 1. This airplane 1 is of conventional construction and, for example, has a tricycle type landing gear provided therefor including a plurality of oleo struts 2 by which the fuselage of the airplane is positioned on wheels 3. The airplane 1 has wings 4 thereon and flaps 5 are provided in adjustable relation to the remainder of the wings 4 at the trailing edges thereof with such flaps and associated control means being of standard construction, except as modified by the apparatus referred to in detail hereinafter.

Figure 2:
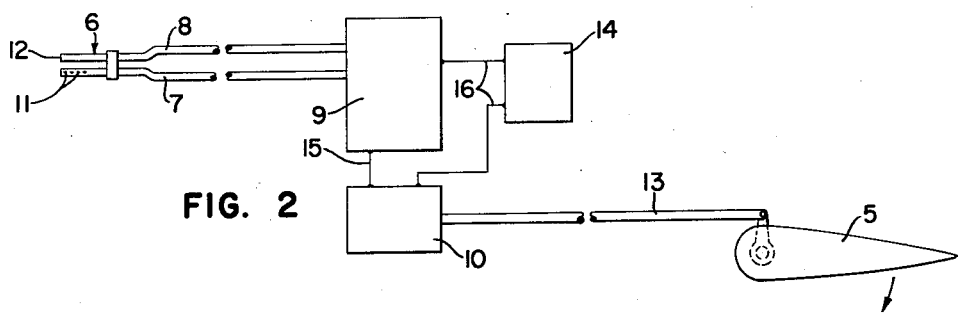
Fig. 2 is a diagrammatic view showing some of the control apparatus of the invention for aircraft wing flaps.
Figure 4:
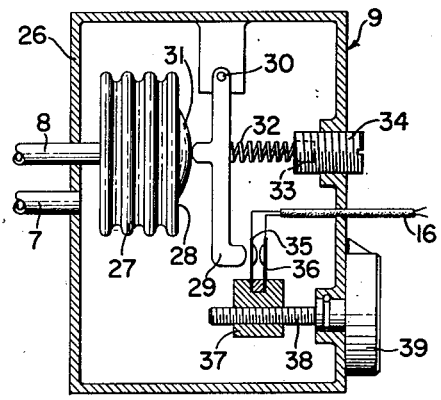
Fig. 4 is a sectional view through the sensing and control unit means of the invention and associated electrical means.

As an important feature of the present invention, a Pitot-static head 6 is provided on the airplane and, for example, it may be secured to the leading edge of the wing 4 and is connected by a pair of tubes 7 and 8 to a sensing and control unit indicated as a whole by the numeral 9, Figs. 2 and 4. This sensing and control unit 9 is operated by the dynamic pressure. A flap actuating mechanism or unit 10 is shown and serves to control the positions of the flaps 5 as described hereinafter in more detail.

Fig. 2 of the drawings shows in more detail the sensing and control unit 9 and associated means and brings out that the tube 7 extending therefrom has a plurality of holes or other openings 11 therein whereby static pressure is transferred through the tube 7 to the control unit 9 for use therein, as hereinafter described. In contrast, the tube 8 has an open end 12 facing forwardly from the aircraft and air is adapted to pass therein and transfer the Pitot pressure (static plus dynamic) to the sensing and control unit 9 for use therein. The flap actuator unit 10 is operated in a conventional manner and is shown as connecting to the flap 5 by a control link 13 movement of which is produced through the flap actuator 10 to move the flap to a desired operative or inoperative position. In order to close the actuating circuit for the flap actuator 10, the sensing and control unit 9 has a switch, described hereinafter in more detail, for closing a circuit from a voltage source generator such as a battery 14 to energize the actuator unit 10 and move the flaps. Lead 15 connects the sensing unit 9 to the control unit 10 while lead 16 connects the voltage source 14 between the same units.

It will be realized that other sources of power may be provided for the flap actuator 10 in some instances, and that a drive member such as a motor, or control valve in a hydraulic system, may be provided to operate the flap actuator 10 when the sensing unit 9 operates.

Figure 3:
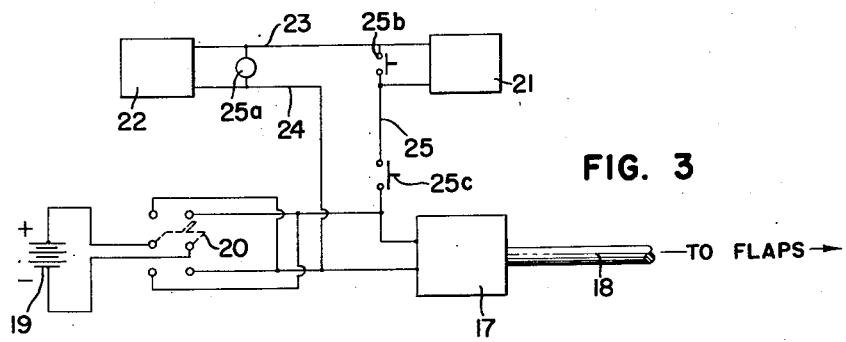
Fig. 3 is a view of an electrical control circuit of the invention in combination with diagrammatic means for controlling aircraft flaps.

The apparatus shown in Fig. 3 is one illustration of apparatus suitable for providing quick movement of the wing flaps under desirable operating conditions for the apparatus of the invention, as pointed out in detail herein. Thus a flap actuator 17 is shown and may comprise an electric motor suitably coupled to a flap actuating rod or link 18 by conventional drive means (not shown). This flap actuator 17 normally is connected to a battery 19 to be actuated thereby when a control switch 20 is operated by the pilot or other person so that the flaps can be moved to and from operative or inoperative positions, as desired. This would be the normal manual control provided for the flaps in an aircraft. A sensing and control unit 21, shown in Fig. 3 is like the unit 9 and has a control switch therein, and is connected to a high voltage generator 22 by a lead 23 extending from one terminal of the sensing unit to the generator 22. A second lead 24 from the generator 22 connects to one terminal of the flap actuator 17. The sensing and control unit 21 is directly connected to the actuator at one terminal thereof by a further lead 25. High voltage application to the flap actuator 17, for example of a voltage twice or three times that normally used to drive the flap actuator motor causes it to be driven at speeds two or three times its normal speed to give a much faster movement than usual for the flaps. This very quickly transfers these flaps to operative position. Overloading the flap actuator motor for the short operative periods required is not harmful because of the infrequent and short periods of motor actuation.

A pilot light 25a may be connected across the leads 23 and 24 to indicate that the generator 22 is working, and a switch 25b may be shunted across the sensing and control unit 21 to be manually closed by the pilot if he is up to V₂ speed and for some reason the sensing unit 21 fails to operate.

The details of the sensing and control unit 9 are best shown in Fig. 4. A suitable air-tight housing 26 is provided and connected to the interior of the housing is conduit 7 which creates static pressure inside the housing. The housing contains a flexible bellows 27 held in place at one end by any desired member such as the Pitot pressure (static plus dynamic) supply tube 8 which connects to the interior of the bellows. The other and movable end 28 of the bellows 27 is adapted to move with changes in the differential pressure set up upon the bellows. The static pressure set up within the housing 26 is in effect subtracted from the Pitot pressure in the bellows so that the resultant or differential pressure is the dynamic pressure created by the forward motion of the airplane. The bellows end 28 when moved by bellows expansion contacts a control lever or contact arm 29 pivotally secured within the housing 26, as by pin 30. A contact button 31 is secured to the bellows end 28. Movement of such contact arm 29 is resisted by a resilient member, such as a control spring 32, one end of which seats against the contact arm 29 and the other end seating in a recess 33 provided in a control screw 34. The control screw 34 is in engagement with the housing 26 and extends into it an adjustable distance.

A free end of the contact arm 29 is adapted to be positioned immediately adjacent a pair of resilient contacts 35 and 36 operatively positioned by and mounted on a slide block 37. The slide block 37 engages a threaded shaft 38 journalled in the housing 26 and having a manual control knob 39 secured to an outer end of such shaft. The slide block 37 is held in any desired manner (not shown) against rotation and is moved axially of the shaft 38 by rotation thereof in order to move the contact arms 35 and 36 a varied distance from the contact arm 29 to thus adjust the sensing and control unit to the existing gross weight of the airplane. Thus on proper expansion movement of the bellows 27, the contact arm 29 is moved sufficiently to bring the adjacent contacts 35 and 36 into engagement for closing an electrical circuit therethrough. It should be noted that adjustment of the screw 34 adjusts the positioning of the spring 32 to thus vary sensitivity or initial adjustment of the apparatus and the action required by the bellows 27 to effect a closing action of the circuit through the contact arm 29.

Figure 5:
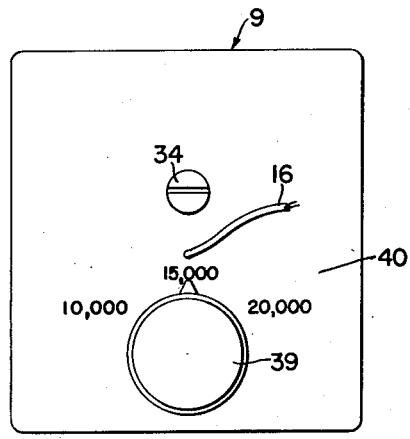
Fig. 5 is a front elevation of the sensing and control unit of Fig. 4 to show the manual control adjustment provided therefor.

The control knob 39, as indicated in Fig. 5, may have some type of a gross weight indicating scale 40 in association therewith. Thus the knob can be adjusted to adjust the control and sensing unit 9 for different gross weights of the aircraft 1, which weights would naturally vary the operating characteristics of the airplane and effect the take-off thereof.

It should be understood that the electric contacts 35 and 36 of control and sensing unit 9 close when the dynamic pressure exerted upon the sensing unit is indicative of V₂ or take-off speed, the gross weight of the airplane having been put into the unit 9 by adjustment of knob 39 as aforesaid. Closing the contacts 35 and 36 rapidly lowers the airplane flaps as hereinafter described to sharply increase the wing lift and thereby lift the airplane into the air.

It may be desirable to provide specific means to turn off the automatic flap actuating mechanism. In the apparatus of Fig. 3, for example, a hand switch 25c can be opened for this purpose and the flaps can then be operated in conventional manner by the standard operating switch 20.

Figure 6:
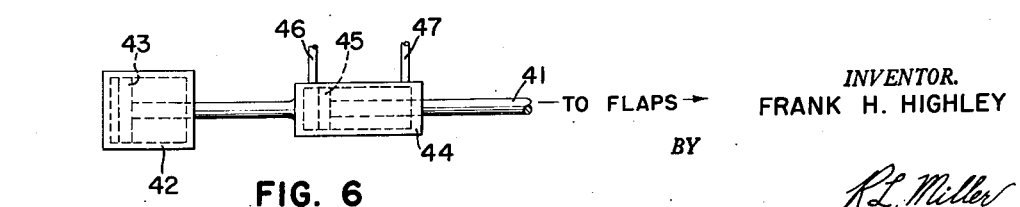
Fig. 6 is a fragmentary elevation of a hydraulic actuating member for use in existing flap actuating rod means.
Figure 7:
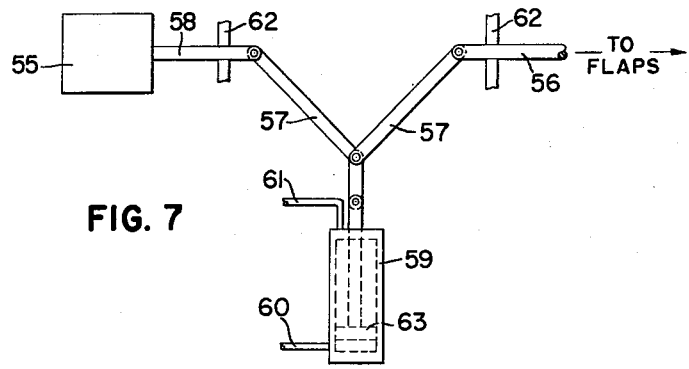
Fig. 7 is a fragmentary elevation, of yet a further modification of alternate means for controlling aircraft flaps by the present invention.

The flap control mechanism of the invention may use any of the apparatus shown in Figs. 6, 7 hereof to aid in effecting rapid flap positioning or movement without interfering with the normal operation of the flap positioning and control means of the aircraft. In Fig. 6 there is shown a hydraulic system in which a flap actuating rod or link 41, suitably coupled to the aircraft flaps is operated by a hydraulic cylinder 42. The rod 41 is controlled by the hydraulic cylinder 42 and normally a piston 43 is positioned in this cylinder and is connected to the rod 41 for reciprocation thereof to effect the desired flap positioning action. In order to secure the desired control action of the invention, the rod 41 is cut and an additional hydraulic cylinder 44 is connected in the rod. One end of the severed rod 41 is connected to the cylinder 44 whereas the opposite end of the rod is connected to a piston 45 positioned within the cylinder. Hydraulic pressure supply lines 46 and 47 connect to opposite ends of the cylinder 44 and are adapted to effect reciprocation of the flap connection portion of the rod 41 with relation to the remainder thereof when the control and sensing unit 9 or similar control is actuated to require operative positioning of the aircraft flaps. Thus, the line 46 would connect, by way of a solenoid valve (not shown), to a pressure supply pump (not shown). Opening of the solenoid valve by the control unit 9 would thus function to move the rod 41 rapidly and quickly position the flaps for take-off.

In the apparatus shown in Fig. 7, a conventional type of a flap actuator unit 55 is shown for reciprocating a control rod 56 that connects to the flaps for moving them to and from operative positions, as desired. This rod 56 is connected to the actuator unit 55 by toggle links 57 that connect to an arm 58 extending from the actuator unit 55 and controlled thereby. A control hydraulic cylinder 59 is provided and is suitably secured to the pivotal connection point between the toggle links 57 so that flow of hydraulic fluid to the cylinder 59 through supply lines 60 and 61, as desired and provided by the control means, will effect movement of the toggle links. The arm or rod 56 and arm 58 are held in place by suitable guides 62 so that such rod 56 will be reciprocated by movement of a piston 63 in the cylinder 59 so that the desired positive and rapid control and operative positioning of the flaps on the aircraft can be provided by the control means of the invention.

Rather than moving flaps to operative position in order to get the desired high lift at take-off time after the aircraft has reached its $V_2$ speed, which is the minimum safe take-off speed for the aircraft, other lift producing means may be actuated. That is, boundary layer control or other known means can be actuated by the apparatus of the invention to provide the desired additional lift on the aircraft wings when take-off speed is reached. Should the take-off run be rejected for any reason, it is important that the flaps be retained in their inoperative positions so that maximum load is carried by the aircraft strut and maximum braking action can be secured. Since the $V_1$ speed is usually reached before $V_2$ speed, when the take-off is rejected, the flaps will be in the retracted position when the braked stop is begun, with the atendant advantage of greater braking effect due to the greater weight of the airplane on the wheels. In other words, if the flaps are down (as in a conventional airplane) to give increased lift at the time of rejected take-off, then less weight is on the aircraft wheels and they cannot be braked as hard without skidding as they can with more weight on them.

It will be realized that the sensing and control units of the invention can actuate a motor, a generator, a valve, a relay and/or other conventional means to produce movement of the flaps or other lift producing means when take-off conditions exist and high lift producing devices are to be made operative automatically immediately prior to take-off. Of course, after take-off the pilot would normally move a suitable control switch and remove the sensing and control units from any control of the airfoil lift changing means, and he would then return the flaps to the normal position.

In view of the foregoing, an automatically functioning device has been provided which is sensitive to the dynamic pressure existing during take-off action so that the take-off run can be shortened because of minimum drag on the aircraft, but with the desired take-off conditions being rapidly and easily established when the take-off run is satisfactory and air speed is reached on the ground.

While a certain representative embodiment and details have been shown for the purpose of illustrating the invention, it will be apparent to those skilled in this art that various changes and modifications may be made therein without departing from the spirit or scope of the invention.

I claim:

1. In an airplane, the combination comprising sustaining airfoils, movable flaps on said airfoils for controlling the lift-drag characteristics of said airfoils, sensing means responsive to the dynamic air pressure acting on the airplane, positioning means connected to said flaps for moving said flaps between a downwardly extending position and a rearwardly extending position, actuation means interconnecting said positioning means and said sensing means, said actuating means and said positioning means being arranged to move said flaps to their downwardly extending position in response to said sensing means when the dynamic air pressure increases to and exceeds a predetermined value, a first control engaging said sensing means for adjusting the sensitivity of said sensing means, and a second control arranged for engagement with said sensing means and operatively connected to said actuating means, said second control being adjustable for selecting said predetermined value of the dynamic air pressure.

2. In an airplane, the combination comprising sustaining airfoils, movable flaps on said airfoils for controlling the lift-drag characteristics of said airfoils, sensing means responsive to the dynamic air pressure acting on the airplane, positioning means connected to said flaps for moving said flaps between a downwardly extending position and a rearwardly extending position, actuation means interconnecting said positioning means and said sensing means, said actuating means and said positioning means being arranged to move said flaps to their downwardly extending position in response to said sensing means when the dynamic air pressure increases to and exceeds a predetermined value, and a control arranged for engagement with said sensing means and operatively connected to said actuating means, said control being adjustable for selecting said predetermined value of the dynamic air pressure.

References Cited in the file of this patent

UNITED STATES PATENTS

| | | |
|---|---|---|
| 2,026,728 | Barnhart | Jan. 7, 1936 |
| 2,342,184 | Fawcett | Feb. 22, 1944 |
| 2,350,751 | Gliubich | June 6, 1944 |
| 2,448,167 | Baak | Aug. 31, 1948 |

FOREIGN PATENTS

| | | |
|---|---|---|
| 55,683 | Holland | Dec. 15, 1943 |
| 862,649 | France | Dec. 16, 1940 |